(12) United States Patent
Sishtla

(10) Patent No.: US 11,203,438 B1
(45) Date of Patent: Dec. 21, 2021

(54) SYSTEM AND METHOD FOR DEICING

(71) Applicant: Rockwell Collins, Inc., Cedar Rapids, IA (US)

(72) Inventor: Venkata A Sishtla, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 407 days.

(21) Appl. No.: 16/219,719

(22) Filed: Dec. 13, 2018

(51) Int. Cl.
*B64D 15/22* (2006.01)
*G01S 13/95* (2006.01)
*B64D 15/12* (2006.01)

(52) U.S. Cl.
CPC ............. *B64D 15/22* (2013.01); *B64D 15/12* (2013.01); *G01S 13/953* (2013.01)

(58) Field of Classification Search
CPC ........ B64D 15/00; B64D 15/12; B64D 15/20; B64D 15/22
See application file for complete search history.

(56) References Cited

U.S. PATENT DOCUMENTS

| | | | | |
|---|---|---|---|---|
| 5,657,951 A * | 8/1997 | Giamati | .................. | B64D 15/14 219/121.66 |
| 6,819,265 B2 * | 11/2004 | Jamieson | ............... | B64D 15/20 340/962 |
| 7,129,846 B2 * | 10/2006 | Rasmussen | ............... | B64F 5/20 340/580 |
| 7,418,347 B2 * | 8/2008 | Nielsen | .................. | B64D 15/20 702/3 |
| 7,664,601 B2 * | 2/2010 | Daly, Jr. | ............... | G01S 13/953 702/3 |
| 8,723,694 B1 | 5/2014 | Finley et al. | | |
| 9,134,418 B1 * | 9/2015 | Kronfeld | ................. | G01S 7/412 |
| 9,558,672 B2 * | 1/2017 | McCann | ................. | G01W 1/00 |
| 9,720,082 B1 * | 8/2017 | Dana | ..................... | G01S 13/953 |
| 9,823,347 B1 * | 11/2017 | Koenigs | .................... | G01S 7/22 |
| 9,846,230 B1 * | 12/2017 | Finley | ..................... | G01S 7/062 |
| 9,864,055 B1 * | 1/2018 | Sishtla | .................. | G01S 13/953 |
| 10,214,294 B1 * | 2/2019 | Gauthier | ................ | B64D 15/20 |
| 2016/0176530 A1 * | 6/2016 | Skjoedt | ..................... | G01P 5/00 374/16 |
| 2016/0229544 A1 * | 8/2016 | Dart | ......................... | B64C 7/00 |
| 2016/0274271 A1 * | 9/2016 | Lukas | ....................... | G01S 7/04 |

OTHER PUBLICATIONS

U.S. Appl. No. 14/206,651, filed Mar. 12, 2014, Rockwell Collins, Inc.
U.S. Appl. No. 14/207,034, filed Mar. 12, 2014, Rockwell Collins, Inc.

* cited by examiner

*Primary Examiner* — Michael H Wang
(74) *Attorney, Agent, or Firm* — Suiter Swantz pc llo

(57) ABSTRACT

An anti-ice system includes an anti-ice element and an electronic processing system. The electronic processing system is configured to determine an icing condition encounter prior to an aircraft entering a region of the icing condition and provide a control signal for causing the anti-ice element to heat a surface or device of the aircraft before the aircraft enters the region.

19 Claims, 5 Drawing Sheets

SYSTEM AND METHOD FOR DEICING

CROSS-REFERENCE TO RELATED APPLICATIONS

The present application related to U.S. application Ser. No. 12/884,040 and U.S. application Ser. No. 14/977,084 which is a continuation in-part of U.S. patent application Ser. Nos. 14/206,239, 14/207,034, and 14/206,651 all of which are incorporated herein by reference in their entireties and assigned to the Assignee of the present application.

BACKGROUND

Embodiments of the inventive concepts disclosed herein relate generally to the removal or mitigation of icing or ice accumulation on surfaces, such as surfaces of an aircraft or anti-ice systems.

Ice or ice crystal formation can pose various threats to aircraft. For example, flying an aircraft through ice or ice crystal formation at high altitudes can cause ice accumulation on engines and airframes. Accumulated ice on surfaces, such as probes, wings, and engine surfaces can cause engine roll back, engine stall, engine flameout, adverse aerodynamic effects, and incorrect airspeed and other measurements. Anti-ice systems on the aircraft respond to in-situ measurements of icing conditions and are engaged after the aircraft is in the icing environments. There is a need for anti-icing systems that more efficiently remove, mitigate or prevent ice accumulation on surfaces of aircraft.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

In one aspect, embodiments of the inventive concepts disclosed herein are directed to an anti-ice system. The anti-ice system includes an anti-ice element and an electronic processing system. The electronic processing system is configured to determine an icing condition encounter prior to an aircraft entering a region of the icing condition and provide a control signal for causing the anti-ice element to heat a surface or device of the aircraft before the aircraft enters the region.

In another aspect, embodiments of the inventive concepts disclosed herein are directed to a method of preventing ice accumulation on an aircraft. The method includes receiving radar reflectivity data and temperature data. The method also includes determining a presence of an icing condition in a flight path of an aircraft in response to the radar reflectivity data and the temperature data. The method also includes providing a control signal to preheat a surface of the aircraft or a probe of the aircraft before the aircraft enters a region of the icing condition.

In another aspect, embodiments of the inventive concepts disclosed herein are directed to a system for use with an anti-ice device. The system includes a signal interface and a processor. The signal interface is configured to provide a signal to the anti-ice device. The processor is configured to identify an icing condition, predict if the aircraft will enter an icing region and provide a control signal at the signal interface before the aircraft enters the icing region. The control signal engages the anti-ice device.

In another aspect, embodiments of the inventive concepts disclosed herein are directed to an apparatus for determining a presence of a convective cell in an environment of an aircraft. The apparatus includes an input for radar reflectivity data and temperature data, and a processing system for determining the presence of the convective cell. The processing system receives the radar reflectivity data and the temperature data and determines the presence of the convective cell by determining an amount of liquid water present at altitudes above the freezing point. The processing signal provides a control signal for engaging an anti-ice element in response to the presence of the conductive cell or an icing region.

In another aspect, embodiments of the inventive concepts disclosed herein are directed to an aircraft warning system that detects a level of an icing condition on a display, the level can be one of two or more icing levels above a no icing condition level. Anti-ice elements can be engaged in response to the level of the icing condition.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE EXEMPLARY EMBODIMENTS

Figure 1:
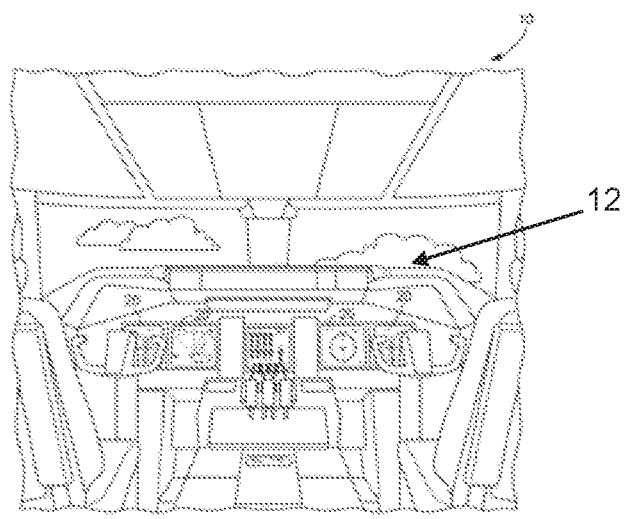
FIG. 1 is a schematic illustration of an aircraft including a control center with an anti-ice control system in accordance with the inventive concepts disclosed herein FIG. 2 a schematic block diagram of the anti-ice system illustrated in FIG. 1 in accordance with the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Systems and methods according to the inventive concepts disclosed herein perform predictive anti-ice operations. Inventive concepts relate to systems and methods for activating in-flight deicing elements in advance of icing conditions. In some embodiments, systems and methods utilize data or a signal from a weather radar system or hazard detection system to engage aircraft anti-icing or deicing for sensors, other probes, and certain aircraft and engine surfaces. In some embodiments, an anti-ice system is part of or communicates with an aircraft hazard warning system or other avionic system that infers or otherwise detects presence of ice or ice crystals (e.g., a high altitude cloud (HAIC) environment) and predictively turns on or engages one or more anti-ice elements so the aircraft is ready when it encounters icing conditions. In some embodiments, the system can work with existing in situ ice sensors to engage the anti-ice elements.

The hazard warning system can detect blow off regions above convective regions as regions of inferred ice crystal detection in some embodiments. The hazard warning system can detect ice hazard regions associated with stratiform rain that follows convective cells in some embodiments. The system can combine direct detection of ice particles with inferred detection of ice particles to provide a unified prediction of an icing environment encounter.

In some embodiments, the systems and methods control the SmartProbe® probes manufactured by UTC Aerospace Systems which include anti-icing devices (heaters, resistive elements, or other deicers). The systems and methods engage or turn on the anti-icing device before the aircraft enters the icing environment based upon predictive encounters with the icing environment. The systems and method can utilize temperature, altitude, radar return data, uploaded weather data, flight path data, lightning data to predict an encounter with an icing environment.

In some embodiments, an anti-ice system detects possible icing conditions and relays that information to the anti-icing sensors or devices located on the wings, probes, or the engine cowling and provide minutes (e.g., 3-8 minutes, approximately 5 minutes) of warning at cruise altitudes. The advance warning provided enables the anti-icing elements or the SmartProbe probes to be heated before the aircraft enters a potential icing region, thereby result in much faster mitigation of airframe icing, especially on the wings and engine cowling. In another example, pitot probes responsible for measuring airspeed can receive the warning and begin heating operations to mitigate or prevent ice accumulation.

In some embodiments, a hazard warning system uses of temperature static air temperature (SAT) or total air temperature (TAT) anomalies to start analyzing for icing like conditions and analyze detected reflectivity at various altitudes to predict icing conditions. The hazard warning system can use temperature data from the uplink source to create a temperature map in front of the aircraft and look for any TAT anomalies, especially in the vicinity of convective storms, as described in the applications incorporated herein by reference. A radar system can perform analyses to look for icing conditions based on the measured reflectivity and send relevant information to the anti-ice system if icing conditions are detected. Uplink temperature information along with several other uplink products can help build confidence in the radar's ability to detect icing conditions.

Parameters such as icing severity (icing intensity across a certain range), confidence in the estimate, etc. can all be part of the data that airborne weather radar can provide to the anti-ice system. In some embodiments, the system and method provide more accurate, long range detection of ice and/or ice crystals for anti-ice operations.

Referring now to FIG. 1, an illustration of an aircraft 10 includes a control center, or cockpit according to some embodiments. The aircraft 10 includes an anti-ice control system 12 and flight displays 20 which are generally used to increase visual range and to enhance decision-making abilities. The aircraft 10 can be a transport aircraft, a military aircraft, a single engine aircraft, a helicopter, a drone, or any vehicle traveling in icing environments.

In some embodiments, flight displays 20 may provide an output from a weather radar system of the aircraft 10, the anti-ice control system 12, or other hazard warning system. For example, the flight displays 20 may provide a top-down view, a horizontal view, or any other view of weather (e.g., potential icing regions) and/or terrain detected by a radar system on the aircraft. In some embodiments, the flight displays 20 provide an indication of a warning related to the environment, such as an icing condition warning. The views of weather and/or terrain may include monochrome or color graphical representations of the weather and/or the terrain. Graphical representations of weather or terrain may include an indication of altitude of those objects (e.g., icing regions) or the altitude relative to the aircraft. The aircraft control center of the aircraft 10 may further include terrain awareness and warning system (TAWS) user interface elements (flashing lights, displays, display elements on a weather radar display, display elements on a terrain display, audio alerting devices, etc.) configured to warn the pilot of potentially threatening terrain features. The TAWS system may be configured to, for example, give the pilots of the aircraft a "pull up" indication (e.g., audibly, visually, etc.) when terrain is detected within an altitude of danger to the aircraft.

A weather radar system (e.g., MultiScan® system by Collins Aerospace Inc. or monopulse radar system) is generally located within the nose of the aircraft 10 or within the aircraft control center. According to an exemplary embodiment, the weather radar system can include, be integrated with, or in communication with the anti-ice control system 12. Alternatively, the anti-ice system 12 can be a separate unit or separate line replaceable unit (LRU).

Figure 2:
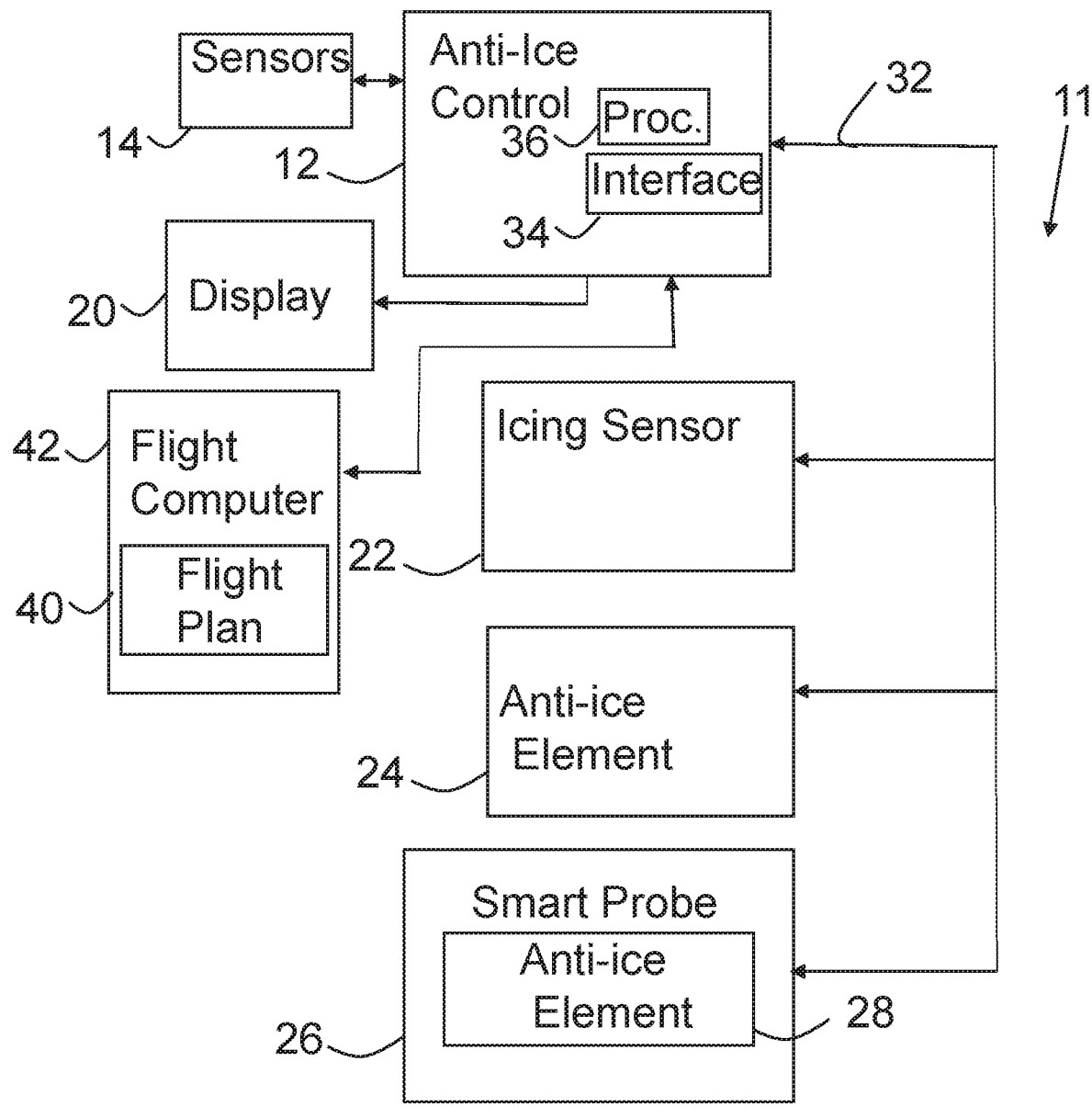

Referring to FIG. 2, an anti-ice system 11 includes the anti-ice control system 12, at least one ice sensor 22, and at least one anti-ice element 24, at least one smart probe 26, or both the at least one anti-ice element 16 and the at least one smart probe 18. The anti-ice control system 12 is in communication with the sensors 14 and the display 20 in some embodiments. The anti-ice control system 12 includes a processor 32 and an interface 34. The anti-ice control system 12 is in communication with a flight computer 42 which stores a flight plan 44.

The sensors 14 includes include an aircraft sensor suite. The sensors 14 include one or more of a weather radar system, a wind detector, a lightning detector, a temperature sensor, an inertial reference system (IRS), a global positioning (GPS) receiver and an altimeter. The anti-ice control system 12 can acquire horizontal and/or vertical reflectivity profiles and direct turbulence detection information via the sensors 12 or from off aircraft sources (e.g., NEXRAD or other weather sources). According to some embodiments, the sensors 14 include any type of sensor or detector that may provide data related to direct or inferred measurement or detection of weather conditions (e.g., icing regions), position and/or hazards.

The icing sensor 22 is a sensor that detects the formation of ice in situ. maintain provided. The icing sensor 22 is a capacitive sensor, an optical sensor, a nuclear sensor, or an acoustic sensor. The probe 26 is a sensor for deployment on the aircraft 10 and includes an anti-ice element 28 which can be similar to the anti-ice elements 24. In some embodiments, the probe 26 is part of a SmartProbe® system by UTC Aerospace Systems which integrates sensing probes, pressure sensors and powerful air data computer processing to provide all critical air data parameters, including Pitot and static pressure, air speed, altitude, angle of attack and angle of sideslip. The probe 26 can be part of the sensor suite associated with the sensors 14.

The anti-ice elements 24 and 28 are any devices for providing an action to remove ice or prevent the formation of ice. In some embodiments, anti-ice elements 24 and 28 use actuators or pneumatic boots to mechanically remove ice. In some embodiments, the anti-ice elements 24 and 28 blow air, provide heat or vibrate to mitigate the formation of ice. In some embodiments, the anti-ice elements 24 and 28 are resistive elements, infrared heating elements, hot bleed air sources, or other heaters.

The flight computer 42 can be any navigation system for the aircraft which provides information related to the flight path of the aircraft. The flight computer 42 can be in communication with position sensors, such as a GPS receiver, an inertial navigation system (INS) or other device. The flight computer 42 can be a flight management computer (FMC).

The anti-ice control system 12 is configured to predict entry into an icing region or potential icing region and provide a control signal via the interface 34 to the anti-ice element 24, the smart probe 26 or both the anti-ice element 24 and the smart probe 26 in some embodiments. The control signal engages or turns on the anti-ice element 24 or the anti-ice element 28 of the smart probe 26 to prevent icing on surfaces or engines of the aircraft 10. The control signal can be provided via a bus or control signal line. The interface 34 drives the control signal for reception by the anti-ice element 24 and the sensor probe 26. The control signal can be addressed for one or more at least one anti-ice element 24, at least one smart probe 26 or can be provided to all of the at least one anti-ice element 24, at least one smart probe 26 simultaneously.

The anti-ice elements 24 and 28 provide apply anti-ice liquid (e.g. alcohol), pneumatically change shape (e.g., pneumatic boot), blow air, heat or vibrate to mitigate the formation of ice. In some embodiments, the anti-ice elements 24 and 28 are resistive elements, infrared heating elements, hot bleed air sources, or other heaters. The control signal is provided a time before the aircraft reaches the icing region. The control signal is provided from 3-15 minutes (e.g., 3-8 minutes, approximately 5 minute) before the aircraft 10 enters of the icing region in some embodiments.

The anti-ice elements 24 and 28 remain engaged or the control signal is maintained until after the aircraft 10 leaves the icing region (e.g., 3 to 15 minutes, approximately 5 minutes after) in some embodiments. If the aircraft is leaving the icing region, and the aircraft 10 is predicted to enter another icing region within a time period, the anti-ice elements 24 and 28 remain engaged even though the aircraft 10 is leaving the icing region.

In some embodiments, the anti-ice elements 24 and 28 are also engaged by the engaged by the icing sensor 22. In some embodiments, the anti-ice control system 12 engages the anti-ice elements and the anti-ice element 28 if either the aircraft is about to enter an icing region or if the icing sensor 12 senses ice on the aircraft 10. In some embodiments, the icing sensor 22 can receive the control signal and engage the anti-ice elements 24 and 28 in response to the control signal or in response to the detection of ice in situ in some embodiments. When neither the control signal or the detection of in situ is present, the anti-ice elements 24 and 28 are disengaged after a time period (e.g., five minutes).

In some embodiments, the processor 36 detects potential icing regions and their locations based upon the strength of a convective cell detected using weather radar data. In some embodiments, the processor 36 uses vertical sweeps on weather cells to assess the vertical extent of moisture with respect to altitude. Air temperature data from the sensors 14 (e.g., temperature measurements) can be used to assess air temperature with respect to altitude. The processor 36 can use the combination of reflectivity and temperature to determine the icing region and the level of the icing condition. The processor 36 uses data from the flight management computer 42 (e.g., the flight plan), the current position of the aircraft 10, and the position of the icing condition to determine whether the aircraft 10 is approaching an icing region and will enter an icing region. The anti-ice control system 12 provides the control signal earlier if the icing region is detected as having a higher level and maintain the control signal for a longer period of time after the aircraft 10 leaves the icing region in some embodiments.

Processor 36 is generally configured to process data received from sensors 14 to determine icing regions and provide icing region indications on display 20. Processor 36 is configured to provide an indication on the display 20 when the anti-ice elements 24 and 28 are engaged. The processor 36 can use a velocity parameter or other Doppler data, a spectral width parameter, a reflectivity parameter, and a range parameter based on return data from a weather radar data system to locate icing regions. The processor 36 can be any hardware and/or software processor, two or more processors, or processing architecture capable of executing instructions and operating on data related to icing conditions. According to various exemplary embodiments, a memory (e.g., any volatile or non-volatile memory) stores data and/or instructions related to anti-ice operations. Temperature data used by the radar system or the processor 36 can include a local atmospheric temperature, local temperature variations with time, local temperature variations with altitude, a remotely determined temperature, and/or remotely determined temperature gradients in either range or altitude.

The processor 36 can use the assessed convective strength of the cell to determine the updraft potential of the cell and hence, the potential of the cell to loft moisture high into the atmosphere where ice crystals form. Higher indications of reflectivity at higher altitudes and lower temperatures indicates a stronger cell and greater potential for ice formation. A specific reflectivity at an altitude where the temperature is at or below the freezing level may indicate the presence of a convective cell. Accordingly, areas above such cells are indicated as warning areas associated with ice. Weaker or smaller cells have less probability of up drafting moisture that forms ice.

In addition, the processor 36 can use a direct measurement of spectral width, to assess the strength of the convective cell and a potential icing region. In some embodiments, processor 36 can use a hybrid approach of that correlates radar reflectivity and lightning data to make a convective and icing assessment on a weather event.

A wind detector can be part of processor 36 or separate from processor 36 and provides a wind parameter. The wind parameter can be high altitude wind speed and direction data. The data can be calculated from track angle and heading of the aircraft 10 or be provided by the flight computer 42 or other navigation equipment. The wind parameter data can also be provided by a source remote from the aircraft. The processor 36 can use the wind parameter to determine if an icing region will or is formed in a particular area.

In some embodiments, the processor 36 correlates radar reflectivity and lightning data to overcome the shortcomings of the lightning strike inaccuracy. The hybrid approach determines lightning strike position relative to radar reflectivity measurements, with sufficient accuracy, to make an icing assessment on a weather event.

The detection of lightning generally indicates the presence of a convective cell and of turbulence within the cell. Detection of a single lightning bolt can infer the presence of a convective cell. The use of lightning history data may provide a more accurate inferred convective cell assessment. If lighting history indicates a high lighting strike rate in a given cell the probability of convection with high magnitude within that cell is high.

Data related to area reflectivity, gradient reflectivity, magnitude reflectivity, reflectivity shape, and/or a sharp change in reflectivity. Very high gradients (e.g., rapid changes from red to black to yellow) can indicate the presence of a convective cell and thus turbulence as well as icing depending on altitude and temperature. According to one exemplary embodiment, the very high gradient may be a change in cell reflectivity within a few range bins (e.g., one nautical mile). According to another exemplary embodiment, the very high gradient may be a change in cell reflectivity within three nautical miles. In some embodiments, reflectivity information can be used to compute an area and/or volume of reflectivity, and the area and/or volume of reflectivity can be used to determine the convective level associated with the cell. In some embodiments, the volume of reflectivity may be translated into a Vertical Integrated Reflectivity measure. Further information regarding computation of areas and/or volumes of reflectivity can be found in the U.S. Pat. No. 9,134,418B1, titled "Weather Hazard Threat Level Computation and Display, which is incorporated herein by reference in its entirety.

If a cell is detected to be growing at a very high rate, it may be a convective cell containing turbulence. If a cell is detected that has grown at a very high rate in the past, the cell may be convective and contain turbulence. For example, the growth may be detected by a vertical structure analysis. The vertical structure analysis data may include vertical height, vertical growth rate, a vertical history assessment, an assessment of whether the aircraft path will intersect a portion of a weather cell, and/or cell maturity data.

In some embodiments, the processor 36 can determine the amount of liquid water at altitudes at temperatures below the freezing point as an indication of a strong convective cell. Amount of liquid can be detected using the reflectivity parameter. In this way, the processor 36 can distinguish between non-convective and convective cells because convective cells cause larger amounts of super cooled water to be up drafted above the freezing point altitude.

After acquiring data from sensors 14, processor 36 may use a variety of processing techniques to assess the ice hazard levels and regions. Processor 36 may identify and track relevant weather cells. The cells may be prioritized in terms of their threat to the aircraft 10 and detailed vertical scans can be conducted on high priority targets. The processor 36 can store a history of cell locations and cell characteristics including but not limited to cell strength, size, vertical height, vertical growth rate, and/or cell maturity data. The anti-ice control system 12 can provide the control signal earlier if the icing region is detected as having a higher level and maintain the control signal for a longer period of time after the aircraft 10 leaves the icing region.

The processor 36 uses data associated with areas around convective cells and former convective cells to provide warnings related to the potential presence of ice or actual presence of ice. In one embodiment, processor 36 can advantageously detect large areas of high altitude ice resulting from convective blow off or from areas of old convection which are difficult to detect using conventional techniques. Ice in these areas is difficult to detect because convective cells are not necessarily located in the regions (e.g., areas of zero convectivity). Generally, it is more difficult to detect ice crystals with conventional techniques when the ice crystals are not being actively formed such as in blow off regions or stratiform rain regions.

Blow off regions are areas of ice presence due to ice crystals being blown from the top of a convective cell by high altitude winds. High altitude ice can also remain above old convective cells (no longer existing cells). A convective cell is an old convective cell if it existed over the region within a predetermined amount of time (e.g., past 5 minutes, past 10 minutes, etc.). Applicant believe that such high altitude ice is generally present over the area associated with old strong convective cells or multiple old convective cells that is occupied by stratiform rain clouds. The larger the stratiform rain area that follows the old convective cell and the more embedded cells of convectivity in the stratiform rain region, the higher the likelihood of presence of ice. Stored history of cell locations and characteristics can be used to identify whether an old convective cell existed in the region and its characteristics while in the region.

Figure 3:
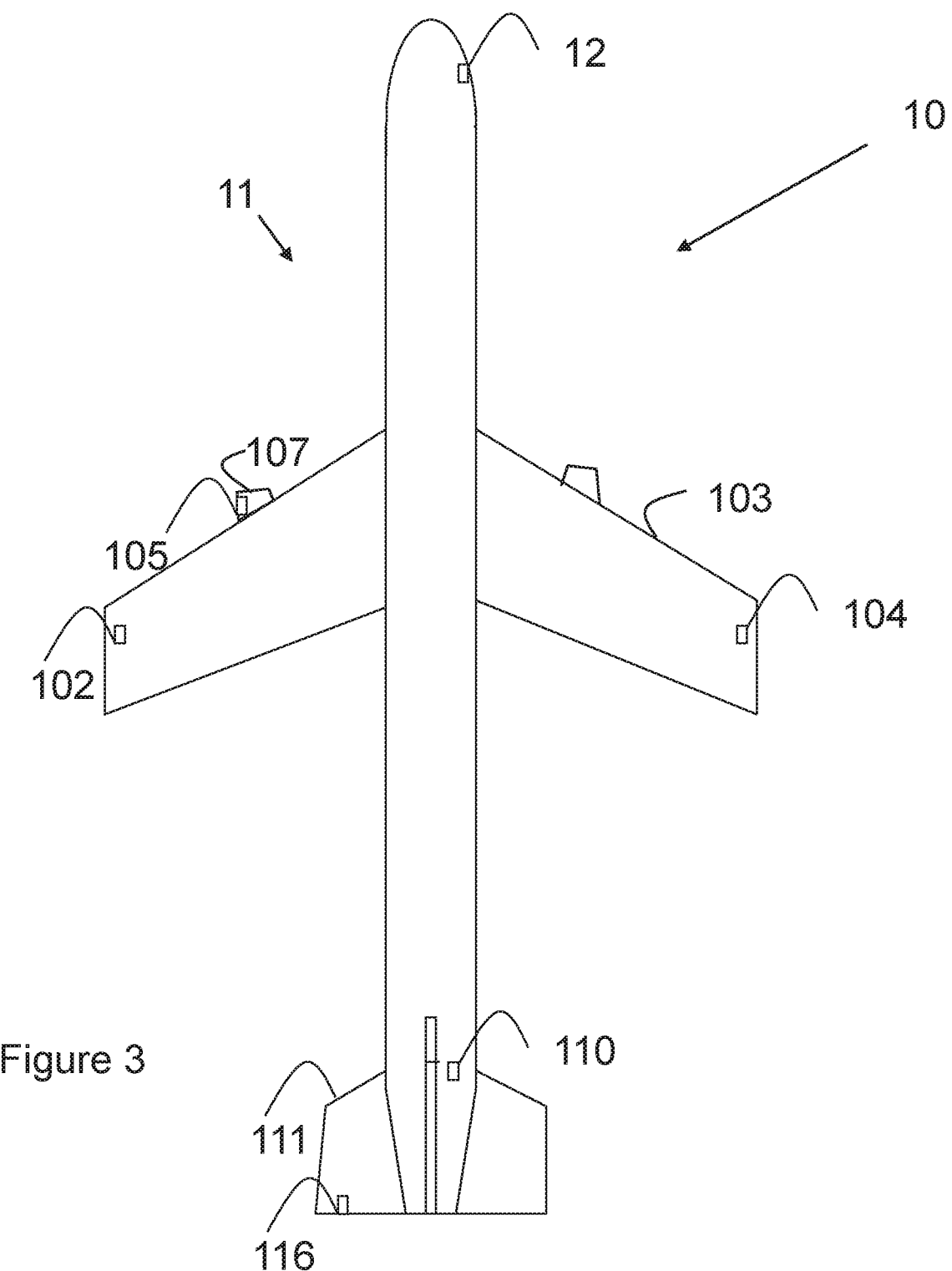
FIG. 3 is a planar top view schematic illustration of the aircraft including anti-ice elements for use with the anti-ice control system illustrated in FIG. 1, in accordance with the inventive concepts disclosed herein.

With reference to FIG. 3, the anti-ice system 11 includes anti-ice elements 102, 104, 105, 110, and 116 (similar to the anti-ice element 24 in FIG. 1) disposed at different locations on aircraft 10. In some embodiment, anti-ice elements 102 and 104 are disposed at or near leading edges or control surfaces of a wing 103. Anti-ice control system 12 is disposed at or near a front of aircraft 10. The anti-ice element 105 is disposed at or near surfaces (e.g., the cowling) of an engine 107. The anti-ice elements 110 and 116 are disposed at or near leading edges or control surfaces of a tail 111.

Figure 4:
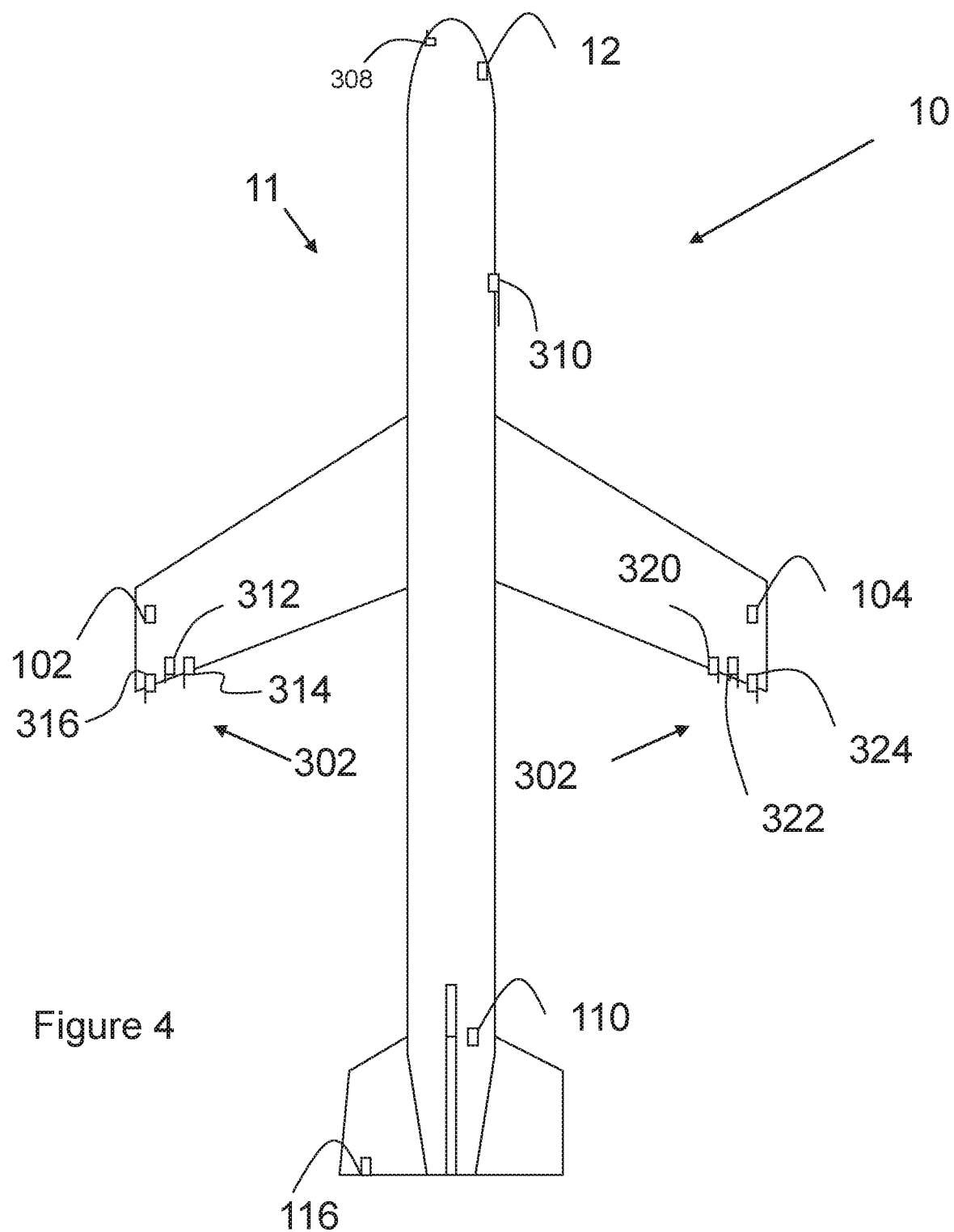
FIG. 4 is a planar top view schematic illustration of an aircraft including anti-ice elements for the anti-ice control system illustrated in FIG. 1, in accordance with the inventive concepts disclosed herein.
Figure 5:
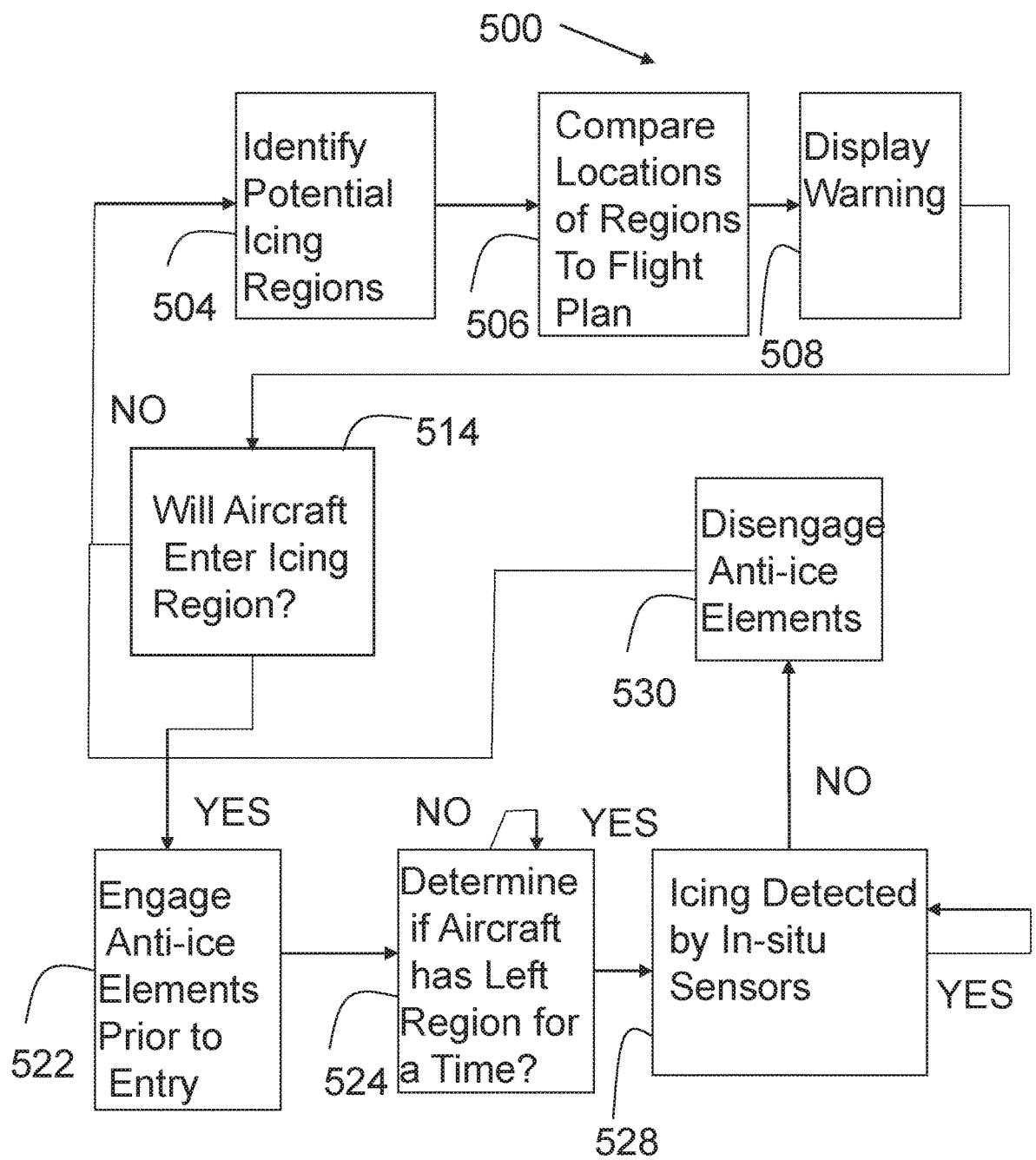
FIG. 5 is a flow diagram of a process executed in the anti-ice control system illustrated in FIG. 1, in accordance with the inventive concepts disclosed herein.

With reference to FIG. 4, a set 302 of smart probes 308, 310, 312, 314, 316, 320, 322, and 324 can be provided on various surfaces of aircraft 10. The smart probes 310, 312, 314, 316, 320, 322, and 324 have anti-ice elements (e.g., a solid-state heater) responsive to the anti-ice control system 12. The smart probes 310, 312, 314, 316, 320, 322, and 324 can be provided at other locations of the aircraft including near the nose cone. The smart probes 308, 310, 312, 314, 316, 320, 322, and 324 provide air data parameters, including Pitot and static pressure, air speed, altitude, a total air temperature sensor.

The anti-ice control system 12 can perform a flow 500 to provide anti-ice operations. At an operation 504, the anti-ice control system 12 determines potential ice in regions using data from the sensors 14 (e.g. radar, position, altitude, and a temperature data). At an operation 506, the location of the potential icing origins is compared to the flight plan 40 to determine whether the aircraft 10 will be entering a potential icing region in the near future. At an operation 508, warnings associated with the identified potential icing regions can be provided on a display.

At an operation 514, the anti-ice control system 12 determines when the aircraft 10 will enter the icing region in the near future (e.g. 3-12 minutes). If so, the anti-ice control system 12 advances to an operation 522. If not, the anti-ice control system 12 returns to the operation 504.

At operation 522, the anti-ice control system 12 engages anti-ice elements prior to entry into the icing region. An indication that anti-ice elements 24 and 28 have been engaged can be provided on the display 20. At an operation 524, the anti-ice control system 12 determines if the aircraft has left the region for a period of time (e.g. 3-12 minutes). If so, the anti-ice control system 12 advances to an operation 528 to determine if icing sensor 22 indicate that icing is detected. If so, the anti-ice elements 24 and 28 are left engaged and the anti-ice control system 12 returns to the operation 528. If the icing sensor 22 does not sense icing at the operation 522, the anti-ice control system 12 advances to an operation 530 and disengages anti-ice elements 24 and 28. After operation 530, the anti-ice control system 12 returns to the operation 504.

At the operation 524, if the aircraft 10 has not left the icing region for a time, the anti-ice elements 24 and 28 remain engaged and the anti-ice control system 12 returns to the operation 524. In operation 524 if the aircraft is about to enter additional icing regions, the anti-ice control system 12 returns to the operation 524 and the anti-ice elements 24 and 28 remain on. At the operation 514, if the aircraft 10 has already entered an icing region, the anti-ice control system 12 advances to operation 522.

In some embodiments, the radar or avionics equipment may receive uplink or off-aircraft information regarding detected and/or forecast regions with icing or icing potential. The radar may be used to qualify or confirm the assessment by adjusting radar parameters when scanning the detected regions (e.g., gain, etc.), increasing the dwell time in those regions, performing additional scans in those regions, etc. The off-aircraft assessment may be used to increase the confidence in the icing assessment and be used to display an icing hazard warning in that region. In some embodiments, the uplink or remote information (e.g., from ground, other aircraft, satellite, etc.) may include an observation or forecast of one or more of weather information of interest, including icing potential, convective level, size, maturity, reflectivity, winds, temperature, etc. The information can be utilized in performing the icing threat assessment.

In some embodiments, the radar response may be received from a multi-frequency radar system, and the radar response from at least two frequencies may be compared to determine the likelihood of ice formation. The difference or ratio between the signals can be used to separate ice detection from traditional rain detection. For example, the larger the response differences from the two frequencies, the greater the likelihood is that the response is from icing.

In some embodiments, the radar response may be received from a polarization diversity radar system, and the radar response from at least two polarization diverse radar signals are compared. The difference or ratio between the signal may be used to separate ice detection from traditional rain detection. For example, the larger the ratio between the horizontal and vertical polarization radar signals, the greater the likelihood that the response is from icing.

In some embodiments, the icing assessment may not be binary (i.e., may not be merely "ice threat" or "no ice threat"). The icing assessment may include a scaled assessment, such that the icing threat potential is identified as one of several levels (e.g., low/medium/high, number on a numerical scale, etc.). In some embodiments, colors, shading, patterns, symbols, icons, etc. used to display the icing threat may be mapped to the different graduated icing levels.

In some embodiments, the icing assessment may be predictive. Weather information associated with a region may indicate an increasing likelihood of icing or may indicate a weather trend that, if it continues, may result in the region experiencing some icing at a future time. In some embodiments, prediction based on regional weather information and/or weather trends may be utilized, alone or in combination with other factors described herein, to provide a predictive icing assessment. In some embodiments, colors, shading, patterns, symbols, icons, etc. may be used to indicate that a displayed threat is related to a predictive icing assessment.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

Some embodiments within the scope of the present disclosure may include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general-purpose computer, special purpose computer, or special purpose processing machine to perform a certain function or group of functions. Machine or computer-readable storage media, as referenced herein, do not include transitory media (i.e., signals in space).

What is claimed is:

1. An anti-ice system, comprising:
   an anti-ice element; and
   an electronic processing system configured to determine an icing condition encounter prior to an aircraft entering a region of the icing condition, compute a wind direction by using a track angle of an aircraft, a heading of the aircraft, and an airspeed of the aircraft and a blow off region is detected in response to the wind direction, the blow off region being an indication of the region of the icing condition, and provide a control signal for causing the anti-ice element to prevent ice build-up on the aircraft before the aircraft enters the region.

2. The anti-ice system of claim 1, wherein the electronic processing system is configured to predictively determine the icing condition encounter at least in part in response to radar reflectivity data sensed onboard the aircraft, and is configured to determine an icing condition level being one of a plurality of icing condition levels, and the anti-ice element is engaged in accordance with the icing condition level.

3. The anti-ice system of claim 1, wherein the anti-ice element is part of a smart probe.

4. The anti-ice system of claim 1, wherein the anti-ice element is a heating element on a cowling of an engine or a control surface.

5. The anti-ice system of claim 1, wherein the icing condition encounter is determined in response to a size of the stratiform region determined from the radar reflectivity data and temperature data and a number of embedded cells in the stratiform region.

6. The anti-ice system of claim 1, wherein the icing condition encounter is determined in response to a number of embedded cells in a stratiform region determined in response to radar reflectivity data and temperature data.

7. The anti-ice system of claim 1, wherein the icing condition encounter is determined using a flight plan of the aircraft.

8. The anti-ice warning system of claim 1, wherein the control signal is provided five minutes or more before the aircraft enters the region.

9. The anti-ice warning system of claim 1, wherein the electronic processing system is part of an avionic weather radar system.

10. A method of preventing ice accumulation on an aircraft, the method comprising:
    receiving radar reflectivity data and temperature data;
    determining a presence of an icing condition in a flight path of an aircraft in response to the radar reflectivity data and the temperature data;
    computing a wind direction by using a track angle of an aircraft, a heading of the aircraft, and an airspeed of the aircraft;
    detecting a blow off region in response to the wind direction, the blow off region being an indication of the icing condition encounter; and
    providing a control signal to preheat a surface of the aircraft or a probe of the aircraft before the aircraft enters a region of the icing condition.

11. The method of claim 10, heating of the surface or the probe is ceased upon the aircraft leaving the region.

12. The method of claim 10, wherein the control signal is provided to an icing sensor on the aircraft.

13. The method of claim 10, wherein vertical structure analysis data is used to determine the presence of the icing condition and comprises one or more of: vertical height, vertical growth rate, vertical history assessment, assessment of whether the aircraft path will intersect a portion of a weather cell, and cell maturity.

14. The method of claim 10, wherein lightning data is used to determine the presence of the icing condition.

15. An aircraft hazard warning system for use with an anti-ice device, comprising:
    a signal interface configured to provide a signal to the anti-ice device;
    a processor configured to identify an icing condition and predict if the aircraft will enter an icing region, compute a wind direction by using a track angle of an aircraft, a heading of the aircraft, and an airspeed of the aircraft and a blow off region is detected in response to the wind direction, the blow off region being an indication of the icing region, and provide a control signal at the signal interface before the aircraft enters the icing region, wherein the control signal engages the anti-ice device.

16. The aircraft hazard warning system of claim 15, wherein the signal interface is coupled to an icing sensor on a surface of the aircraft.

17. The aircraft hazard warning system of claim 16, wherein the icing sensor is configured to engage the anti-icing device if the icing condition is sensed by the icing sensor when the control signal is not provided.

18. The aircraft hazard warning system of claim 16, wherein the control signal is removed 3 to 8 minutes after the aircraft leaves the icing region.

19. The aircraft hazard warning system of claim 15, wherein the control signal is provided 3-8 minutes before the aircraft enters the icing region based upon a calculation using a flight plan of the aircraft and an airspeed of the aircraft.

* * * * *